(12) United States Patent
Zhang et al.

(10) Patent No.: US 11,131,882 B2
(45) Date of Patent: Sep. 28, 2021

(54) LIGHT SOURCE CONTROL ASSEMBLY, DISPLAY DEVICE AND METHOD FOR MANUFACTURING LIGHT SOURCE CONTROL ASSEMBLY

(71) Applicant: BOE TECHNOLOGY GROUP CO., LTD., Beijing (CN)

(72) Inventors: Can Zhang, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 530 days.

(21) Appl. No.: 15/776,388

(22) PCT Filed: Aug. 25, 2017

(86) PCT No.: PCT/CN2017/099066
§ 371 (c)(1),
(2) Date: May 15, 2018

(87) PCT Pub. No.: WO2018/153042
PCT Pub. Date: Aug. 30, 2018

(65) Prior Publication Data
US 2020/0264478 A1    Aug. 20, 2020

(30) Foreign Application Priority Data
Feb. 23, 2017    (CN) .......................... 201710101444.8

(51) Int. Cl.
G02F 1/13357    (2006.01)
(52) U.S. Cl.
CPC .. G02F 1/133606 (2013.01); G02F 1/133603 (2013.01)
(58) Field of Classification Search
CPC ..................... G02F 1/133606; G02F 1/133603
See application file for complete search history.

(56) References Cited

U.S. PATENT DOCUMENTS

2002/0003201 A1* 1/2002 Yu ...................... H01L 27/14603
250/208.1
2009/0323313 A1* 12/2009 Choi ................. G02F 1/133606
362/97.2

(Continued)

FOREIGN PATENT DOCUMENTS

CN    101169491 A1    4/2008
CN    101922669 A   * 12/2010

(Continued)

OTHER PUBLICATIONS

English Translation of International Search Report & Written Opinion, for PCT Patent Application No. PCT/CN2017/099066, dated Nov. 28, 2017, 23 pages.

(Continued)

*Primary Examiner* — Rajarshi Chakraborty
*Assistant Examiner* — Nathaniel J Lee
(74) *Attorney, Agent, or Firm* — Kinney & Lange, P.A.

(57) ABSTRACT

A light source control assembly, a display device and a method for manufacturing a light source control assembly are provided in embodiments of the disclosure. The light source control assembly, comprises: a photoelectric converter; at least one light-emitting unit; and a light controlling structure arranged opposite to and spaced apart from the at least one light-emitting unit, and configured to pass therethrough a portion of and to block another portion of light, which light is emitted by various light-emitting units of the at least one light-emitting unit, and to generate a plurality of controlled light beams separated from one another with the portion of light passing therethrough; the another portion of light blocked by the light controlling structure from the various light-emitting units is received by the photoelectric converter.

17 Claims, 4 Drawing Sheets

(56) References Cited

U.S. PATENT DOCUMENTS

| | | | |
|---|---|---|---|
| 2010/0091224 A1 | 4/2010 | Cho et al. | |
| 2014/0204578 A1 | 7/2014 | Kim et al. | |
| 2014/0226110 A1* | 8/2014 | Doyle | G02F 1/133603 349/69 |
| 2015/0359067 A1* | 12/2015 | Kurita | G02F 1/133603 315/151 |

FOREIGN PATENT DOCUMENTS

| | | |
|---|---|---|
| CN | 101922669 A | 12/2010 |
| CN | 103591514 A1 | 2/2014 |
| CN | 103939793 A | 7/2014 |
| CN | 104791668 A | 7/2015 |
| CN | 106206671 A | 12/2016 |
| CN | 106838849 A | 6/2017 |

OTHER PUBLICATIONS

Chinese Office Action dated Nov. 5, 2018, received for corresponding Chinese Application No. 201710101444.8.

* cited by examiner

LIGHT SOURCE CONTROL ASSEMBLY, DISPLAY DEVICE AND METHOD FOR MANUFACTURING LIGHT SOURCE CONTROL ASSEMBLY

CROSS-REFERENCE TO RELATED APPLICATIONS

This application is a Section 371 National Stage Application of International Application No. PCT/CN2017/099066, filed on Aug. 25, 2017, entitled "LIGHT SOURCE CONTROL ASSEMBLY, DISPLAY DEVICE AND METHOD FOR MANUFACTURING LIGHT SOURCE CONTROL ASSEMBLY", which has not yet been published, which claims priority to Chinese Application No. 201710101444.8, filed on Feb. 23, 2017, incorporated herein by reference in entirety.

BACKGROUND OF THE DISCLOSURE

Field of the Disclosure

Embodiments of the present disclosure relate to a light source control assembly, a display device and a method for manufacturing a light source control assembly.

Description of the Related Art

Various light sources are used on various occasions such as illumination, LCD display backlight source and lamp box and the like. In addition to laser, general light sources are typically scattering/diffused light sources, each of which possesses a relatively large light-emitting angle, e.g., respective light rays thereof may be emitted to be uniformly distributed, within a relatively large angle range and without specific propagating directions. However, on certain application occasion(s), it is only required to have light beams which have certain propagation direction(s) or propagate within a certain divergence angle range from respective light source(s). By way of example, in a display which uses LED or OLED light-emitting units as backlight sources, light rays emitted by the light source are controlled (e.g., in a range of emergent light), resulting in controlled light beams being emitted in certain predetermined direction(s) so as to meet requirements in certain application context, such as peer-proof (i.e., privacy) context.

It is known that a method for controlling light rays of backlight sources of a LCD display operates to absorb undesired light of relatively large angles beyond a predetermined small angle range originating from light emitting units of LED or OLED, and the like, and only allows light rays which originate from the light emitting units of LED or OLED and the like and fall within the predetermined small angle range to propagate in essentially consistent direction(s) towards the LCD display panel so as to function as a display light source, such that requirements in certain application context, such as peer-proof (i.e., privacy) context may be met.

SUMMARY OF THE DISCLOSURE

Following technical solutions are adopted in exemplary embodiments of the disclosure.

According to an aspect of the exemplary embodiment of the present disclosure, there is provided a light source control assembly, comprising: a photoelectric converter; at least one light-emitting unit; and a light controlling structure arranged opposite to and spaced apart from the at least one light-emitting unit, and configured to pass therethrough a portion of and to block another portion of light, which light is emitted by various light-emitting units of the at least one light-emitting unit, and to generate a plurality of controlled light beams separated from one another with the portion of light passing therethrough; the another portion of light blocked by the light controlling structure from the various light-emitting units is received by the photoelectric converter.

According to an embodiment of the disclosure, the light controlling structure comprises:

a plurality of light-transmitting portions, configured such that light rays each being emitted by the various light-emitting units and failing to go beyond a first divergence angle range penetrate and emit outwards from the various light-transmitting units respectively; and a plurality of light-blocking portions, configured such that the light rays each being emitted by the various light-emitting units and going beyond the first divergence angle range are received by the photoelectric converter to produce electric energy.

According to an embodiment of the disclosure, the at least one light emitting-unit is provided on the photoelectric converter;

the light-controlling structure comprises a covering plate opposite to and spaced apart from the photoelectric converter, the cover plate being above a side of the at least one light-emitting unit facing away from the photoelectric converter and comprising the plurality of light-transmitting portions and the plurality of light-blocking portions; and the plurality of light-blocking portions comprise a plurality of light reflecting portions configured to reflect the light rays each being emitted by the various light-emitting units and going beyond the first divergence angle range, towards the photoelectric converter.

According to an embodiment of the disclosure, the covering plate is a transparent covering plate, the plurality of light reflecting portions comprise a plurality of light-reflecting elements on a surface of the transparent covering plate facing towards the photoelectric converter, and the plurality of light transmitting portions comprises at least one of portions of the transparent covering plate other than the plurality of light-reflecting elements and through-holes formed in the transparent covering plate.

According to an embodiment of the disclosure, the covering plate is an opaque covering plate, the plurality of light reflecting portions comprise a plurality of light-reflecting elements on a surface of the opaque covering plate facing towards the photoelectric converter, and the plurality of light transmitting portions comprise through-holes formed in the opaque covering plate.

According to an embodiment of the disclosure, the plurality of light-reflecting elements are a plurality of light-reflecting coatings applied on a surface of the cover plate facing towards the photoelectric converter.

According to an embodiment of the disclosure, the light source control assembly further comprises a substrate on which the at least one light-emitting unit is provided;

the light-controlling structure comprises a covering plate opposite to and spaced apart from the substrate, the cover plate being above a side of the at least one light-emitting unit facing away from the substrate and comprising the plurality of light-transmitting portions and the plurality of light-blocking portions; and the plurality of light-blocking portions comprise a plurality of the photoelectric converters configured to receive light rays each being emitted by the various light-emitting units and going beyond the first divergence angle.

According to an embodiment of the disclosure, the covering plate is a transparent covering plate, a plurality of photoelectric converters are formed on a surface of the transparent covering plate facing towards the substrate, and the plurality of light-transmitting portions comprise at least one of portions of the transparent covering plate other than the plurality of photoelectric converters and through-holes formed in the transparent covering plate.

According to an embodiment of the disclosure, the covering plate is an opaque covering plate, and the plurality of photoelectric converters are formed on a surface of the opaque covering plate facing towards the substrate, and the plurality of light-transmitting portions comprise through-holes formed in the opaque covering plate.

According to an embodiment of the disclosure, the plurality of photoelectric converters are thin-film batteries.

According to an embodiment of the disclosure, each of the at least one light-emitting unit forms a point light source, and each of the plurality of light-transmitting portions of the covering plate forms a round shape, respectively, each of the plurality of light-transmitting portions having a radius $R=Y*tg\alpha$, wherein Y refers to a distance between one light-emitting unit and a corresponding one of the plurality of light-transmitting portions, and $\alpha$ refers to the first divergence angle.

According to an embodiment of the disclosure, the plurality of light-blocking portions comprise at least annular portions surrounding the plurality of light-transmitting portions of round-shape respectively in one-to-one correspondence and abutting against and being tangent to one another at outer peripheries thereof, with their respective tangent points among the annular portions extending in at least a row in a longitudinal direction of the covering plate, and with a width of each of the annular portions in respective radial direction being at least $Z1=Y*tg\beta-R$, wherein $\beta$ refers to a maximal light divergence angle of each of the at least one light-emitting unit.

According to an embodiment of the disclosure, the at least one light-emitting unit forms linear light sources respectively, and the plurality of light-transmitting portions of the covering plate are formed to be strip shapes extending in a transverse direction perpendicular to a longitudinal direction of the covering plate and in parallel with one another, with a width of each of the plurality of light-transmitting portions being $X=2Y*tg\alpha$, wherein Y refers to a distance between the one light-emitting unit and a corresponding one of the plurality of light-transmitting portions, an $\alpha$ refers to the first divergence angle.

According to an embodiment of the disclosure, the plurality of light-blocking portions comprise at least strip-shaped portions adjacent to each side of the plurality of light-transmitting portions, with a width of each of the strip-shaped portions being at least $Z2=Y*tg\beta-X/2$, wherein $\beta$ refers to a maximal light divergence angle of each of the at least one light-emitting unit.

According to an embodiment of the disclosure, the first divergence angle $\alpha$ is not less than 1° and not more than 10°.

According to an embodiment of the disclosure, the maximal light divergence angle $\beta$ of each of the at least one light-emitting unit is not less than 50° and not more than 70°.

According to an embodiment of the disclosure, each of the at least one light-emitting unit is an OLED element.

According to an embodiment of the disclosure, the photoelectric converter comprises at least one of an opaque solar-cell panel, comprising: a silicon thin-film solar-cell, a copper indium gallium selenide thin-film solar-cell, and a polymer solar-cell.

According to another aspect of the exemplary embodiment of the present disclosure, there is provided a display device, comprising: a display panel; and a backlight source, comprising the light source control assembly as above.

According to another aspect of the exemplary embodiment of the present disclosure, there is provided a method for manufacturing a light source control assembly, comprising:

providing a photoelectric converter;

providing at least one light-emitting unit, each configured to emit light by receiving electric energy; and providing a light controlling structure opposite to and spaced apart from the at least one light-emitting unit, the light controlling structure being configured to pass therethrough a portion of and to block another portion of light, which light is emitted by various light-emitting units of the at least one light-emitting unit, and to generate a plurality of controlled light beams separated from one another with the portion of light passing therethrough, with the another portion of light failing to pass therethrough from the various light-emitting units being received by the photoelectric converter.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION OF PREFERRED EMBODIMENTS

Figure 1:
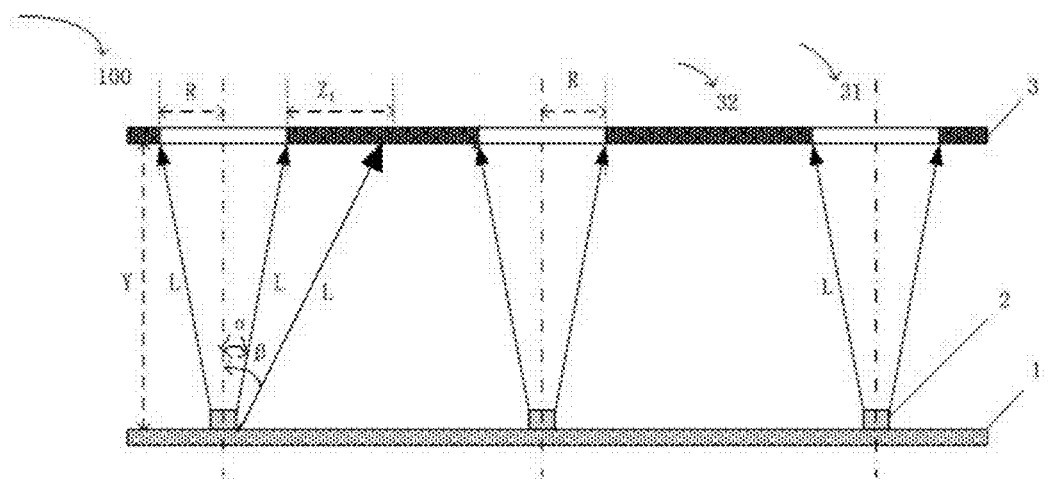
FIG. 1 illustrates a simplified structural schematic view of a light source control assembly according to an embodiment of the disclosure.

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to exemplarily illustrate the contents of the disclosure, rather than to demonstrate the practical dimension or proportion of components of the light source control assembly, and the display device.

According to a general technical concept of the present disclosure, there is provided a light source control assembly, comprising: a photoelectric converter; at least one light-emitting unit adapted to emit light by receiving electrical energy; and a light controlling structure arranged opposite to and spaced apart from the at least one light-emitting unit, and configured to pass therethrough a portion of and to block another portion of light, which light is emitted by various light-emitting units of the at least one light-emitting unit, and to generate a plurality of controlled light beams separated from one another with the portion of light passing therethrough; the another portion of light blocked by the light controlling structure from the various light-emitting units is received by the photoelectric converter. The light source control assembly according to the embodiments of the disclosure may apply the photoelectric converter to recycle other light rays which may not be used to generate controlled light beams directly, resulting in an improved light utilization rate.

Specifically, the photoelectric converter is for example a solar-cell plate, which receives light of a relatively large angle emitted by light-emitting units and not used to generate controlled light beams, and such light of a relatively large angle is converted to electric energy for power supply for the light-emitting units. The solar-cell plate is taken for example hereinafter to illustrate exemplary embodiments of the disclosure.

FIG. 1 illustrates a simplified structural schematic view of a light source control assembly 100 according to an embodiment of the disclosure. As illustrated in FIG. 1, the light source control assembly 100 comprises a solar-cell plate 1 functioning as the photoelectric converter; and at least one light-emitting unit 2 provided on the solar-cell plate 1. FIG. 1 illustrates a condition in which there are a plurality of light-emitting units 2, and each light-emitting unit 2 is for example a dot light source (or spot light source) or a linear light source, rather than a planar light source emitting parallel light or a light collimator emitting collimated light. The plurality of light-emitting units 2 may receive electric energy from a power supply so as to emit beams of light rays L. The light source control assembly 100 further comprises a covering plate 3 disposed opposite to and spaced apart from the solar-cell plate. The covering plate 3 is constructed to pass therethrough a portion of and to block another portion of light, which light is emitted by the at least one light-emitting unit 2, and to generate a plurality of controlled light beams separated from one another with the portion of light passing therethrough. By way of example, as illustrated, the covering plate 3 is disposed above a side of the plurality of light-emitting units 2 facing away from the solar-cell plate 1 and is spaced apart from the plurality of light-emitting unit 2. And the covering plate 3 functions as a light controlling structure, comprising a plurality of light-transmitting portions 31 and a plurality of light-reflecting portions 32. Specifically, as illustrated in FIG. 1, the plurality of light-transmitting portions 31 and the plurality of light-reflecting portions 32 are arranged alternately, and adjacent light-transmitting portions of the plurality of light-transmitting portions 31 are spaced apart from one another, and adjacent light-reflecting portions 32 of the plurality of light-reflecting portions 32 are spaced apart from one another, and the plurality of light-transmitting portions 31 are aligned in one-to-one correspondence with the plurality of light-emitting units 2, such that light rays which are emitted by various light-emitting units 2 and fail to go beyond a predetermined divergence angle ($\alpha$) range may propagate through the plurality of light-transmitting portions 31 and exit therefrom; and the plurality of light-reflecting portions 32 form light-blocking portions, such that the light rays which are emitted by various light-emitting units 2 and go beyond the predetermined divergence angle ($\alpha$) range may be absorbed again by the solar-cell plate 1 so as to be recycled to generate electric energy. And the divergence angle in the embodiments of the disclosure as illustrated in FIG. 1 is defined to be an included angle between a normal at each light-emitting unit 2 and a direction in which outermost divergent light beams emitted thereby propagate. In other embodiments of the disclosure, the electric energy produced by above solar-cell plate 1 may for example be used as an auxiliary power supply so as to supply electricity to the light-emitting source 2, or be used for other usages.

According to a specific example, a condition in which the plurality of light-transmitting portions 31 are aligned in one-to-one correspondence with the plurality of light-emitting units 2 comprises a following condition/context, e.g., an orthogonal projection of each light-emitting unit 2 towards the covering plate 3 falls at a central position of a light-transmitting portion 31 provided in alignment with the light-emitting unit.

By way of example, said another portion of light emitted by various light-emitting units and blocked by the covering plate 3 is further received by the photoelectric converter. Specifically, the plurality of light-reflecting portions 32 reflect the light rays, which are emitted by various light-emitting units 2 and go beyond the predetermined divergence angle ($\alpha$) range, towards the solar-cell plate 1, so as to be absorbed again by the solar-cell plate 1 and to be recycled to produce electric energy. The electric energy thus produced in turn enters the light-emitting units 2 such that the light-emitting units 2 emit light rays. Specific angle of the predetermined divergence angle may be determined by those skilled, e.g., depending on desired level of control for controlled light. For example, the predetermined angle $\alpha$ may be chosen to be 5°.

In above embodiments, the light-emitting units 2 may for example be ordinary LED light sources, or OLED light sources. In addition, the light-emitting units 2 may for example be dot light sources, or alternatively be linear light sources. In a condition of dot light sources, the light source control assembly according to the embodiments of the disclosure may for example provide dot light beams controlled to be divergent in various directions surrounding each dot light source, each dot light beam having a divergence angle falling within a predetermined range, i.e., such that spots at the light-transmitting portions formed by the light beams passing through the light-transmitting portions of the light controlling structure may essentially be controlled to planar dimensions not larger than those of the light-transmitting portions, so as to meet requirements of various application occasions which needs the dot light beams. In a condition of linear light sources, the light source control assembly according to the embodiments of the disclosure may for example provide controlled linear light beams in a width direction of the linear light sources, each linear light beam having a divergence angle falling within the predetermined range, so as to meet requirements of various application occasions which needs the linear light beams.

As an exemplary embodiment, the solar-cell plate 1 is for example a solar-cell which may be opaque, such as an opaque silicon thin-film solar-cell, a copper indium gallium selenide (CIGS) thin-film solar-cell, and a polymer solar-cell, and the like, whose structure and method for preparation may be the same as those of an ordinary solar-cell.

Figure 2:
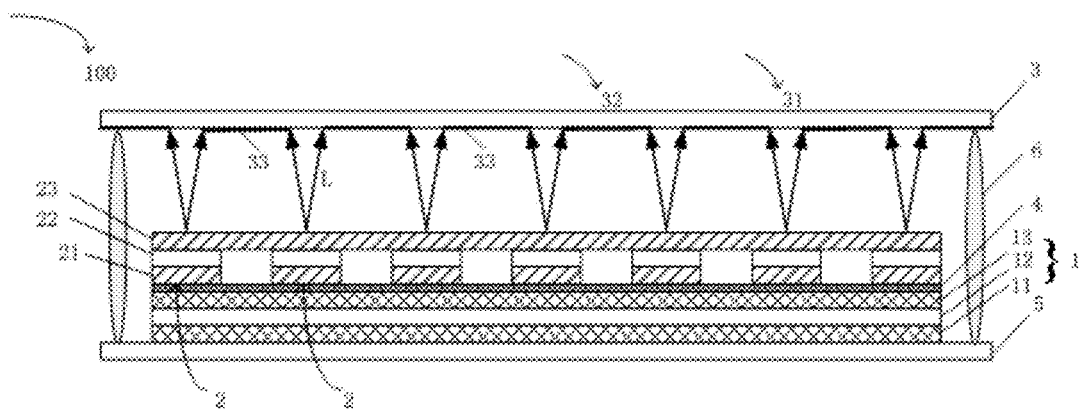
FIG. 2 illustrates a schematic view of an exemplary specific structure of the light source control assembly as illustrated in FIG. 1.

FIG. 2 illustrates a schematic view of an exemplary specific structure of the light source control assembly 100 as illustrated in FIG. 1. As illustrated in FIG. 2, the light-emitting units 2 use OLED light sources. The OLED light source comprise an anode 21, an organic light-emitting layer 22 and a cathode 23 overlapping with one another, the anode 21 being for example prepared by a transparent indium tin oxide material (ITO) material. For example, the organic light-emitting layer 22 specifically comprises a hole injection layer, a hole transport layer, a light-emitting layer, an electron transport layer and an electron injection layer and the like. The cathode 23 is for example an electrically conductive layer of a transparent material. By way of example, as illustrated in FIG. 2, the anode 21 comprises a plurality of anode unit structures independently of and spaced apart from one another, and the organic light-emitting layer 22 comprises a plurality of organic light-emitting layer unit structures independently of and spaced apart from one another, and the cathode 23 is for example illustrated to be in a form of an integral cathode covering the organic light-emitting layer 22. In an alternative embodiment, the illustrated cathode may be constructed to comprise a plurality of cathode unit structures aligned with the anode 21 and the organic light-emitting layer 22 respectively and independently of and spaced apart from one another.

As set forth herein, each anode unit and each organic light-emitting layer unit thereon and a corresponding cathode portion form collectively each of the OLED light-emitting units, for receiving electric energy provided by the solar-cell 1 so as to emit light. The solar-cell plate 1 is for example in a form of an integral sheet of solar-cell plate as illustrated in FIG. 2, specifically comprising a lower electrode 11, a P-N junction 12 and an upper electrode 13 overlapping with one another. For example, an insulative passivation layer 4 is provided between the solar-cell plate 1 and each OLED light-emitting unit 2. The anode 21 and the cathode 23 of each OLED light-emitting unit may for example be connected electrically with the lower electrode 11 and the upper electrode 13 of the solar-cell plate 1, respectively, so as to receive electric energy provided by the solar-cell plate 1. It should be understood that, in addition to the solar-cell plate 1, the light source control assembly 100 may for example comprise other power supply, for providing electric energy to the OLED units, without being limited in this connection herein.

As illustrated in FIG. 2, the light source control assembly 100 further comprises a substrate 5 formed by glass, on which the solar-cell plate 2 is formed. A covering plate 3 is provided opposite to the substrate 5, with a spacer 6 being supported therebetween, so as to form a space between the covering plate 3 and the substrate 5 for accommodating both the OLED light-emitting units 2 and the solar-cell 1. The spacer 5 is for example an UV curing adhesive.

It should be noticed that, FIG. 2 only illustrates schematically a structure of the light source control assembly 100 according to an embodiment of the disclosure. For clarity, only structures relating to an inventive subject matter of the disclosure are illustrated, with other known structure being omitted. It should be understood by those skilled in the art that, the light source control assembly 100 of the embodiment may for example further comprise other necessary components comprising an ordinary OLED light source, and the solar-cell plate 1 may also for example comprise other necessary components comprising an ordinary solar-cell plate, without being repeated herein any more.

As illustrated in FIG. 2, according to an embodiment, the covering plate 3 is for example a transparent glass covering plate, and the plurality of light-reflecting portions 32 are for example formed by a plurality of light-reflecting elements 33 which are for example formed on a surface of the transparent covering plate 3 facing towards the solar-cell plate 1 and spaced apart from one another, and the plurality of light-transmitting portions 31 are for example formed by other portions of the transparent covering plate 3 other than the plurality of light-reflecting elements 33, and/or through-holes formed through the transparent covering plate, i.e., the plurality of light-transmitting portions 31 are spaced apart from one another by the plurality of light-reflecting elements 33. Here, the covering plate 3 is thus formed into the light controlling structure, and the plurality of light transmitting portions 31 are used to pass light which is essentially controlled therethrough, and the plurality of light-reflecting portions 32 are used to reflect light of a large angle. The light controlling structure of the embodiments of the disclosure may not be limited thereto. It may easily be contemplated by those skilled other light controlling structures which may form both light-transmitting portions and light-blocking portions thereon.

As an alternative embodiment, for example, the covering plate 3 may also be an opaque covering plate, and the plurality of light-reflecting portions 32 may also be a plurality of light-reflecting elements 33 disposed on a surface of the opaque covering plate facing towards the photoelectric converter, and the plurality of light-transmitting portions 31 may comprise a plurality of through-holes formed through the opaque covering plate.

Figure 3:
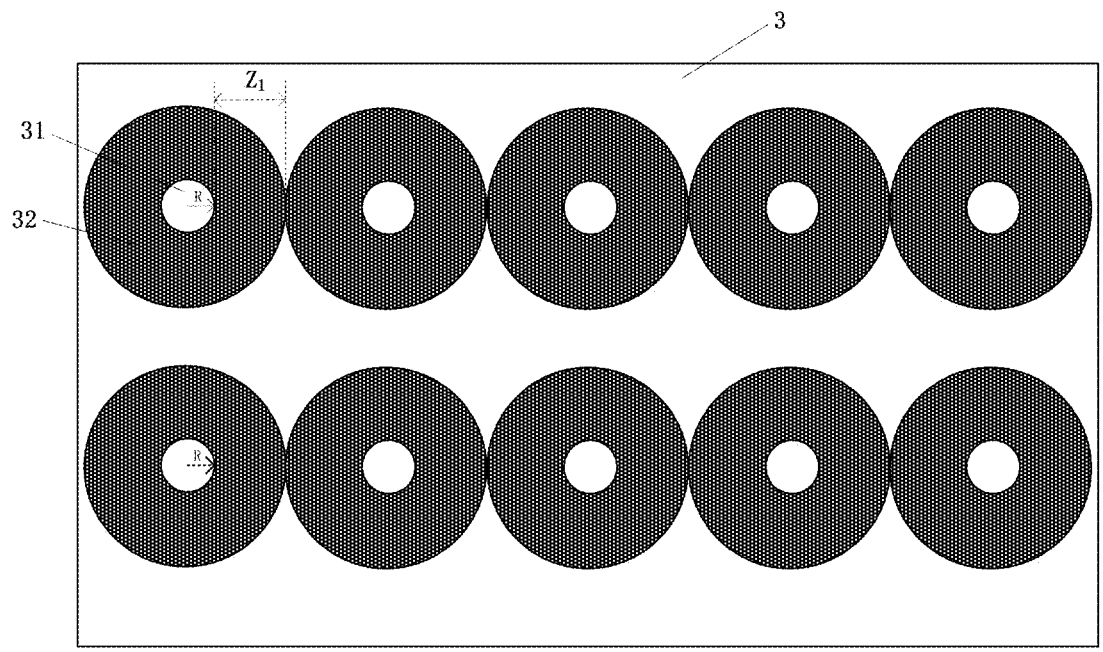
FIG. 3 illustrates a schematic top view of a covering plate in the light source control assembly as illustrated in FIG. 2.

FIG. 3 illustrates a schematic top view of a covering plate 3 in the light source control assembly as illustrated in FIG. 2. As illustrated in FIG. 1 and FIG. 3, in a condition that the plurality of light-emitting units 2 form dot light sources, each of the plurality of light-transmitting portions 31 of the covering plate 3 correspondingly forms a round shape. An orthogonal projection of each light-emitting unit 2 on the covering plate 3 falls at a central position of a corresponding light-transmitting portion 31 provided in alignment with the light-emitting unit. As illustrated in FIG. 1, there is a distance Y between the light-emitting units 2 and the covering plate 3, then a radius of each light-transmitting portion 31 should be R=Y*tgα, wherein α refers to the predetermined divergence angle.

Therefore, both the radius R of each light-transmitting portion and the distance Y between the light-emitting units and the covering plate may be set by those skilled depending on a desired predetermined divergence angle α of the controlled light. For example, the predetermined divergence angle α is larger than or equal to 1° and less than or equal to 10°.

By way of example, if the predetermined divergence angle α is selected as 5°, since there is a relation, i.e., tg5°≈0.87, then it may be obtained that R/Y=0.87, wherein R refers to the radius of each light-transmitting portion 31 of round-shape, and Y refers to a vertical dimension between the light-emitting units 2 and the covering plate 3. For example, R is 5 μm and then Y should be approximately 5.75 μm.

In addition, according to some embodiments, a maximal light divergence angle of each light-emitting unit 2 may be represented by angle β, the plurality of light-reflecting portions 32 may for example comprise annular portions surrounding the plurality of light-transmitting portions 31 of round-shape respectively in one-to-one correspondence and abutting against and being tangent to one another at outer peripheries thereof, with tangent points (i.e., points of tangency) among the light-reflecting portions 32 extending in at least a row in a longitudinal direction of the covering plate, being illustrated to be arranged in two rows as illustrated in FIG. 3. In such a condition, a width of each of the annular portions in respective radial direction is at least $Z1=Y*tg\beta-R$. As such, light rays which are emitted by the light-emitting units 2 other than those falling within the predetermined divergence angle for generating controlled light, i.e., light rays of a relatively large angle having a divergence angle between a and 13 may for example be reflected back to the solar-cell plate 1 completely by the plurality of light-reflecting portions 32 shaped as the annular portions, to the solar-cell plate 1, so as to be received and recycled by the solar-cell plate 1 to generate electric energy, the electric energy is in turn applied to the OLED light-emitting units to emit light, such that the light source control assembly of the embodiment enhances light utilization rate and decreases power consumption.

Therefore, sizes of each of the plurality of light-reflecting portions may be designed by those skilled in the art depending on the maximal light emitting angle β of each of specific light-emitting units, the distance Y between the plurality of light-emitting units and the covering plate, and the radius R of each of the plurality of light-transmitting portions. For example, the maximal light emitting angle β is larger than or equal to 50° and less than or equal to 70°.

For example, by experiments, it may be known that, the maximal light emitting angle β of the OLED light emitting unit is typically approximately 60°, then, dimensions of devices may be designed provided that the maximal light emitting angle is 60°. By way of example, if it is required that the controlled light should possess the predetermined divergence angle within 5°, since there is a relation, i.e., $tg5°=R/Y$, then $R\approx0.87y$; and there is also a relation, i.e., $tg60°=(R+Z1)/Y$, then $Z1\approx1.645Y$. For example, provided that R is 5 μm, then Y should be about 5.75 μm, and Z1 should be about 9.46 μm.

It should be noticed that, for clarity, FIGS. 1-3 may not necessarily be drawn to scale. In addition, although FIG. 3 illustrates that each light-reflecting portion 32 is the annular portion surrounding a corresponding light-transmitting portion 31 of round shape, however, for facilitating manufacturing, the plurality of light-reflecting portions 32 may further comprise all remaining portions of the covering plate 3 other than the plurality of light-transmitting portions 31 of round shape.

Above embodiment illustrate schematically a condition in which each light-emitting unit is a dot light source; and dot light beams controlled to be divergent in various directions surrounding each dot light source and having respective divergence angle falling within a predetermined range may be provided by the light source control assembly of the embodiment, so as to meet requirements of various application occasions which needs the dot light beams.

And method for manufacturing the light source control assembly 100 according to embodiments as illustrated in FIGS. 1-3 is then set forth in detail hereinafter.

Above all, a substrate is provided, e.g., a glass substrate; Then, a solar-cell plate of an integral sheet is manufactured on the substrate, the solar-cell plate comprising a lower electrode, a P-N junction and an upper electrode.

The solar-cell plate is for example a solar-cell which may be opaque, such as an opaque silicon thin-film solar-cell, a copper indium gallium selenide (CIGS) thin-film solar-cell, and a polymer solar-cell, and the like, whose method for preparation may be the same as those of an ordinary solar-cell, without repeating herein any more.

Next, an insulative passivation layer may be deposited on the upper electrode of the solar-cell plate; and then an OLED dot-matrix light source may be prepared on the passivation layer above the upper electrode of the solar-cell plate, the OLED dot-matrix light source may for example be formed by depositing sequentially an ITO anode layer, a hole injection layer, a hole transport layer, a light-emitting layer, an electron transport layer, an electron injection layer, and a cathode layer, with fine masks. Furthermore, by manufacturing for example through-holes, anode and cathode of each OLED light emitting unit may be connected electrically with the upper electrode and the lower electrode of the solar-cell plate respectively, such that the plurality of light-emitting units may receive electric energy from the solar-cell plate so as to emit light.

Subsequently, the covering plate and the substrate are connected by coating the UV curing adhesive on the substrate. The covering plate is for example preformed to comprise a plurality of light-transmitting portions, and a plurality of light-reflecting portions functioning as the light-blocking portions. In a further embodiment, the plurality of light-reflecting elements may for example be a plurality of light-reflecting coatings applied on a surface of the covering plate facing towards the photoelectric converter. Specifically, e.g., a transparent covering plate is provided, and a metallic reflective film is for example deposited on a surface of the transparent covering plate to be arranged facing towards the solar-cell plate, so as to form a plurality of light-reflecting portions, with other portions being formed to be light-transmitting portions. Once the UV curing adhesive is applied onto the substrate, the covering plate is placed on the UV curing adhesive; and furthermore, when the covering plate and the substrate are connected, the plurality of light-transmitting portions are aligned in one-to-one correspondence with the plurality of light-emitting units. For example, an orthogonal projection of each light-emitting unit 2 on the covering plate 3 falls at a central position of a corresponding light-transmitting portion 31 provided in alignment with the light-emitting unit. After that, e.g., the UV curing adhesive is then irradiated by UV radiation so as to be cured. Thereby, the substrate and all components formed thereon (comprising the solar-cell), the UV curing adhesive and the covering plate are bonded as a whole.

During manufacturing and connecting of the covering plate, e.g., as set forth above by referring to FIGS. 1-3, e.g., each light-emitting unit is a dot light source, then both the radius R of each light-transmitting portion of round shape and the distance Y between the light-emitting units and the covering plate may be set by those skilled depending on a desired predetermined divergence angle α of the desired controlled light. And sizes of each of the plurality of light-reflecting portions may be designed by those skilled in the art depending on the maximal light emitting angle β of each of specific light-emitting units, the distance Y between the plurality of light-emitting units and the covering plate, and the radius R of each of the plurality of light-transmitting portions.

As to the covering plate thus manufactured, the plurality of light-transmitting portions are constructed to be in alignment with the plurality of light-emitting portions respectively, in position relationship, such that light rays each being emitted by the various light-emitting units and failing to go beyond the predetermined divergence angle penetrate and emit outwards from the various light-emitting units respectively so as to function as the controlled light; and the plurality of light-reflecting portions are configured to reflect the light rays each being emitted by the various light-emitting units and going beyond the predetermined divergence angle, towards the solar-cell plate so as to be recycled again by the solar-cell plate to generate electric energy, which energy may be provided to the light-emitting units to generate light.

As to the light source control assembly and the method for manufacturing the same as set forth above, since the solar-cell is contained within the light source control assembly, and then the solar-cell receives the light at a large angle which is emitted from the light-emitting units and may not be used directly to generate the controlled light, so as to convert the energy of such portion of light into the electric energy for power supply to the light-emitting units. As such, a light utilization rate of the light source control assembly of the embodiment is enhanced and a power consumption of the light-emitting units is decreased, and desired controlled light beams are also obtained.

Figure 4:
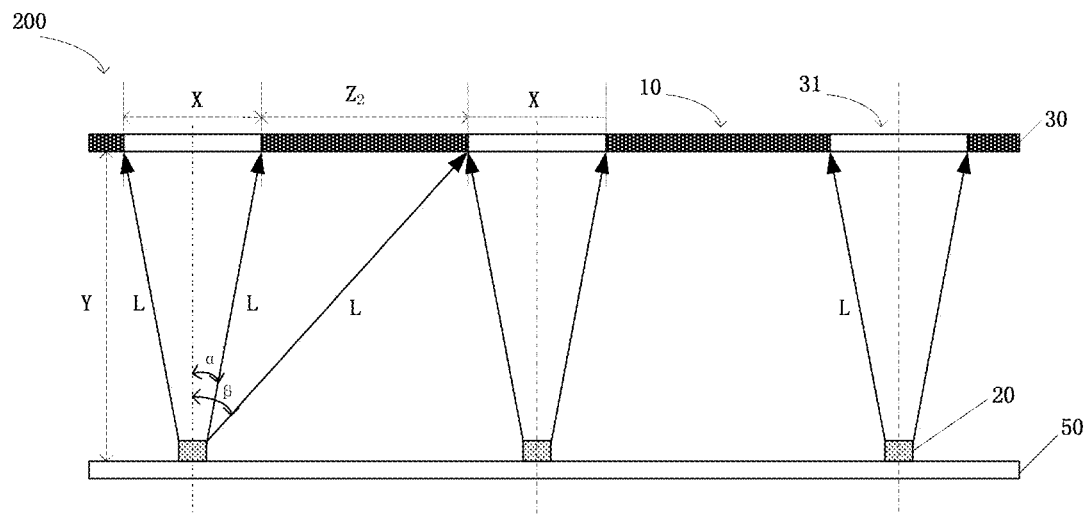
FIG. 4 illustrates a simplified structural schematic view of a light source control assembly according to another embodiment of the disclosure.

FIG. 4 illustrates a simplified structural schematic view of a light source control assembly 200 according to another embodiment of the disclosure. As illustrated in FIG. 4, for example, the light source control assembly 200 comprises a substrate 50, a plurality of light emitting units 20 disposed on the substrate 50 and spaced apart from one another, and a covering plate 30 provided opposite to the substrate 50. A spacer 60 is supported between the covering plate 30 and the substrate 50, so as to form a space for accommodating the OLED light-emitting units 20. The spacer 60 is for example a conductive adhesive.

Differing from the embodiment as illustrated in FIG. 1, the covering plate 30 of this embodiment comprises a plurality of light-transmitting portions 31 and a plurality of photoelectric converters 10 (e.g., a plurality of solar-cell plates 10), i.e., the photoelectric converters are integrated inside the covering plate, rather than being disposed separately from and spaced apart from the covering plate as illustrated in FIG. 1. The plurality of light-transmitting portions 31 are aligned in one-to-one correspondence with the plurality of light-emitting units 20, similar to the embodiment illustrated in FIG. 1, such that light rays which are emitted by various light-emitting units 20 and fail to go beyond the predetermined divergence angle ($\alpha$) range may propagate through the plurality of light-transmitting portions 31 and exits therefrom so as to function as the controlled light; for example, an orthogonal projection of each light-emitting unit 2 on the covering plate 3 falls at a central position of a light-transmitting portion 31 provided in alignment with the light-emitting unit. The plurality of solar-cell plates 10 form the light-blocking portion respectively, such that the light rays which are emitted by various light-emitting units 20 and go beyond the predetermined divergence angle ($\alpha$) range may be absorbed by the solar-cell plates 10 so as to be recycled to generate electric energy.

Specifically, the plurality of solar-cell plates 10 are configured to absorb directly the light rays which are emitted by various light-emitting units 20 and go beyond the predetermined divergence angle ($\alpha$) range, and to implement a photo-electric conversion so as to generate electric energy. Thereafter, the electric energy thus generated may for example be delivered through electrical connection element(s) to the light-emitting units 20 such that the light-emitting units 20 may emit light.

In above embodiment, the plurality of light-emitting units 20 may for example be ordinary LED light sources, or OLED light sources. In addition, each of the light-emitting units 20 may for example be a dot light source, or alternatively be a linear light source, rather than a planar light source emitting parallel light or a light collimator emitting collimated light. As an exemplary embodiment, each of the solar-cell plates 10 is for example a solar-cell which may be opaque, such as an opaque silicon thin-film solar-cell, a copper indium gallium selenide (CIGS) thin-film solar-cell, and a polymer solar-cell, and the like, whose structure and method for preparation may be the same as those of an ordinary solar-cell. The substrate 50 is for example a glass substrate.

Figure 5:
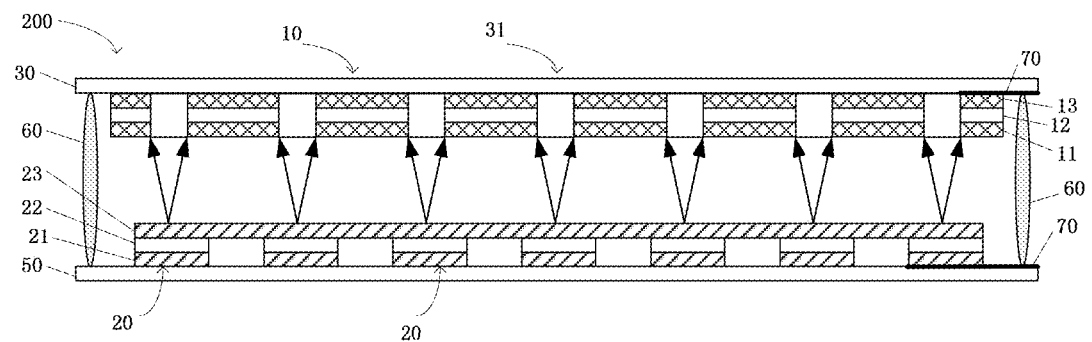
FIG. 5 illustrates a schematic view of an exemplary specific structure of the light source control assembly as illustrated in FIG. 4.

As a specific alternative embodiment, FIG. 5 illustrates a schematic view of an exemplary specific structure of the light source control assembly 200 as illustrated in FIG. 4. As illustrated in FIG. 4, the light-emitting units 2 use OLED light sources. The OLED light sources comprise an anode 21, an organic light-emitting layer 22 and a cathode 23 overlapping with one another on the substrate 50, the anode 21 being for example prepared by a transparent indium tin oxide material (ITO) material. For example, the organic light-emitting layer 22 specifically comprises a hole injection layer, a hole transport layer, a light-emitting layer, an electron transport layer and an electron injection layer and the like. The cathode 23 is for example an electrically conductive layer of a transparent material. By way of example, as illustrated in FIG. 5, the anode 21 comprises a plurality of anode unit structures independently of and spaced apart from one another, and the organic light-emitting layer 22 comprises a plurality of organic light-emitting layer unit structures independently of and spaced apart from one another, and the cathode 23 is for example illustrated to be in a form of an integral cathode covering the organic light-emitting layer 22. In an alternative embodiment, the illustrated cathode may be constructed to comprise a plurality of cathode unit structures aligned with the anode 21 and the organic light-emitting layer 22 respectively and independently of and spaced apart from one another.

As set forth herein, each anode unit and each organic light-emitting layer unit provided thereon and a corresponding cathode portion form collectively each of the OLED light-emitting units 20, for receiving electric energy provided by a corresponding solar-cell 10 so as to emit light. Each solar-cell plate 10 is for example in a form of an integral sheet of solar-cell plate as illustrated in FIG. 5, specifically comprising an upper electrode 13, a P-N junction 12 and a lower electrode 11, overlapping with one another on a side of the covering plate 30 opposite to and facing towards the substrate 50. The lower electrode 11 and the upper electrode 13 of each solar-cell plate 10 is for example connected electrically to the anode 21 and the cathode 23 of a corresponding OLED light-emitting unit 20, respectively, e.g., via a corresponding lead wire 70, the spacer 60 which is electrically conductive, and corresponding through-hole(s), so as to deliver the electric energy of such solar-cell plate 10 to such OLED light-emitting unit 20; and then the OLED light-emitting unit 20 receives the electric energy from the solar-cell plate 10 so as to emit light. It should be understood that, in addition to the solar-cell plate(s) 10, the light source control assembly 200 may for example further comprise other power supply, for providing electric energy to the OLED units, without being limited in this connection herein. In fact, as compared with above light source control assembly 100 as illustrated in FIG. 2, the light source control assembly 200 differs in that, the plurality of solar-cell plates 10, i.e., the lower electrode 11, the P-N junction 12 and the upper electrode 13 are provided on a side of the covering plate 30 opposite to and facing towards the substrate 50, rather than being provided directly on a side of the substrate 50 opposite to and facing towards the covering plate 30 as illustrated in FIG. 2.

It should be noticed that, FIG. 5 only illustrates schematically a structure of the light source control assembly 200 according to an embodiment of the disclosure. For clarity, only structures relating to an inventive subject matter of the disclosure are illustrated, with other known structure being omitted. It should be understood by those skilled in the art that, the light source control assembly 200 of the embodiment may for example further comprise other necessary components comprising an ordinary OLED light source, and each solar-cell plate 10 may also for example comprise other necessary components comprising an ordinary solar-cell plate, without being repeated herein any more. In addition, for clarity, FIG. 5 may not necessarily be drawn to scale.

As illustrated in FIG. 4, according to an embodiment, the covering plate 30 is for example a transparent glass covering plate, and the plurality of solar-cell plates 10 are formed by thin-film batteries formed on a surface of the transparent covering plate 30 facing towards the substrate 50, and the plurality of light-transmitting portions 31 are for example formed by other portions of the transparent covering plate 30 other than the plurality of solar-cell plates 10. Here, the covering plate 30 is thus formed into the light controlling structure, and the plurality of light transmitting portions 31 are used to pass light which is essentially controlled therethrough, and the plurality of solar-cell plates 10 are used to absorb light of a large angle. The light controlling structure of the embodiments of the disclosure may not be limited thereto. It may easily be contemplated by those skilled other light controlling structures which may form both light-transmitting portions and light-blocking portions thereon.

As an alternative embodiment, for example, the covering plate 30 may also be an opaque covering plate, and the plurality of photoelectric converters 10 may also be formed on a surface of the opaque covering plate facing towards the substrate 30, and the plurality of light-transmitting portions 31 may comprise a plurality of through-holes formed through the opaque covering plate 30.

Figure 6:
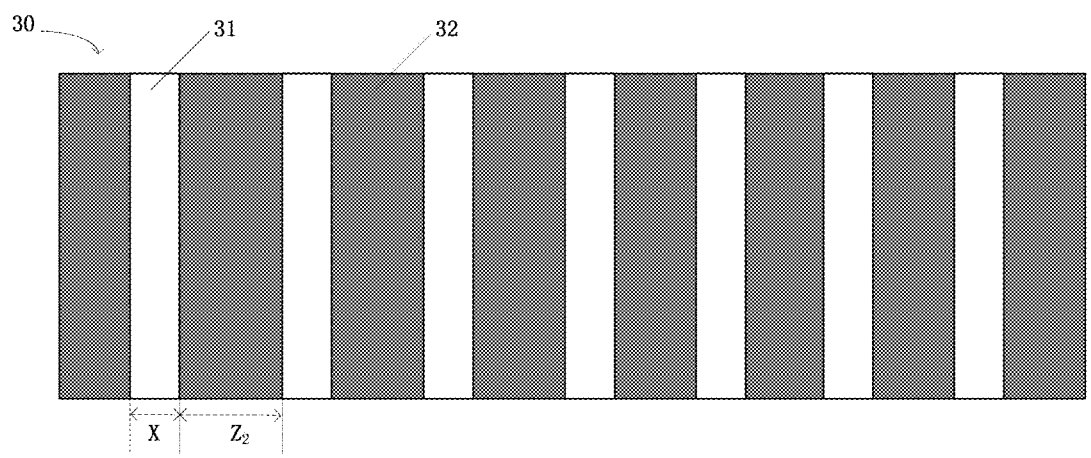
FIG. 6 illustrates a schematic top view of a covering plate in the light source control assembly as illustrated in FIG. 5.

FIG. 6 illustrates a schematic top view of a covering plate 30 in the light source control assembly as illustrated in FIG. 5. As illustrated in FIG. 4 and FIG. 5, in a condition that the plurality of light-emitting units 20 form linear light sources, each of the plurality of light-transmitting portions 31 of the covering plate 30 correspondingly forms a strip shape (e.g., a strip shape which for example extends in a transverse direction perpendicular to a longitudinal direction of the covering plate and in parallel with one another). As illustrated in FIG. 4 and FIG. 6, there is a distance Y between the light-emitting units 20 and the covering plate 30, then a width of each of the plurality of light-transmitting portions 31 of strip shape is $X=2Y \cdot tg\alpha$, wherein $\alpha$ refers to the predetermined divergence angle.

Therefore, both the width X of each light-transmitting portion and the distance Y between the light-emitting units and the covering plate may be set by those skilled depending on a desired predetermined divergence angle $\alpha$ of the controlled light. For example, the predetermined divergence angle $\alpha$ may be chosen from a range of 1°-10°.

By way of example, if the predetermined divergence angle $\alpha$ is selected as 5°, since there is a relation, i.e., $tg5° \approx 0.87$, then it may be obtained that $X/2Y=0.87$, wherein X refers to the width of each light-transmitting portion 31 of strip-shape, and Y refers to a vertical dimension between the light-emitting units 20 and the covering plate 30. For example, X is 10 μm and then Y should be approximately 5.75 μm.

In addition, according to some embodiments, a maximal light divergence angle of each light-emitting unit 20 may be represented by angle $\beta$, the plurality of solar-cell plates 10 forming the light-blocking portions may for example comprise strip portions adjacent to each side of the plurality of light-transmitting portions 31 respectively in one-to-one correspondence. In such a condition, a width Z2 of each of the strip portions is at least $Z2=Y \cdot tg\beta - X/2$. As such, light rays L which are emitted by the light-emitting units 20 other than those falling within the predetermined divergence angle for generating controlled light, i.e., light rays of a relatively large angle having a divergence angle between $\alpha$ and $\beta$ may for example be absorbed completely by the plurality of solar-cell plates 10, so as to be received and recycled again by the plurality of solar-cell plates 10 to generate electric energy, the electric energy is in turn applied via electrical connection unit(s) to the OLED light-emitting units 20 to emit light, such that the light source control assembly of the embodiment enhances light utilization rate and decreases power consumption.

Therefore, sizes of each of the plurality of solar-cell plates 10 may be designed by those skilled in the art depending on the maximal light emitting angle $\beta$ of each of specific light-emitting units, the distance Y between the plurality of light-emitting units and the covering plate, and the width X of each of the plurality of light-transmitting portions. For example, the maximal light emitting angle $\beta$ is typically chosen from a range of 50°-70°.

For example, by experiments, it may be known that, the maximal light emitting angle $\beta$ of the OLED light emitting unit is typically approximately 60°, then, dimensions of devices may be designed provided that the maximal light emitting angle is 60°. By way of example, if it is required that the controlled light should possess the predetermined divergence angle within 5°, since there is a relation, i.e., $tg5°=X/2Y$, then $X/2 \approx 0.87y$; and there is also a relation, i.e., $tg60°=(X/2+Z2)/Y$, then $Z2 \approx 1.645Y$. For example, provided that X is 10 μm, then Y should be about 5.75 μm, and Z2 should be about 9.46 μm.

Above embodiments illustrate schematically a condition in which each light-emitting unit is a linear light source; and linear light beams controlled to be divergent in a width direction of the linear light source and having respective divergence angle falling within a predetermined range may be provided by the light source control assembly of the embodiment, so as to meet requirements of various application occasions which needs the linear light beams.

And method for manufacturing the light source control assembly 200 according to embodiments as illustrated in FIGS. 4-6 is then set forth in detail hereinafter.

Above all, a substrate is provided, e.g., a glass substrate;

Then, an OLED dot-matrix light source is prepared on the substrate, the OLED dot-matrix light source may for example be formed by depositing sequentially an ITO anode layer, a hole injection layer, a hole transport layer, a light-emitting layer, an electron transport layer, an electron injection layer, and a cathode layer, with fine masks.

Subsequently, the covering plate and the substrate are connected by coating a conductive adhesive on the substrate. The covering plate is for example preformed in advance to comprise a plurality of light-transmitting portions, and a plurality of solar-cell plates functioning as the light-blocking portions. In a further embodiment, the plurality of light-reflecting elements may for example be a plurality of light-reflecting coatings applied on a surface of the transparent covering plate facing towards the photoelectric converter. Specifically, e.g., a transparent covering plate is provided, and a thin-film solar-cell is for example prepared on a surface of the transparent covering plate to be arranged facing towards the solar-cell plates, so as to function as a plurality of light-blocking portions, with other portions being formed to be light-transmitting portions. Once the conductive adhesive is applied onto the substrate, the covering plate is placed on the conductive adhesive; and furthermore, when the covering plate is connected, the plurality of light-transmitting portions are aligned in one-to-one correspondence with the plurality of light-emitting units. For example, an orthogonal projection of each linear light-emitting unit 20 on the covering plate 30 falls at a central position of a corresponding light-transmitting portion 31 of strip shape provided in alignment with the light-emitting unit. When the covering plate is being manufactured, e.g., lead wires and through-holes and the like are formed on the solar-cell plates, such that once the covering plate is connected, the electric energy of the solar-cell plates may be delivered to the light-emitting units via the lead wires, the through-holes, the conductive adhesive and the like, such that the light emitting units generate light. After that, e.g., the conductive adhesive is then cured. Thereby, the substrate and all components formed thereon, the conductive adhesive, and the covering plate and all components formed thereon (comprising the solar-cell) are bonded as a whole.

During manufacturing and connecting of the covering plate, e.g., as set forth above by referring to FIGS. 4-6, e.g., each light-emitting unit is a linear light source, then both the width X of each light-transmitting portion of strip shape and the distance Y between the light-emitting units and the covering plate may be set by those skilled depending on a desired predetermined divergence angle α of the desired controlled light. And sizes of each of the plurality of solar-cell plates may be designed by those skilled in the art depending on the maximal light emitting angle β of each of specific light-emitting units, the distance Y between the plurality of light-emitting units and the covering plate, and the width X of each of the plurality of light-transmitting portions.

As to the covering plate thus manufactured, the plurality of light-transmitting portions are constructed to be in alignment with the plurality of light-emitting portions respectively, in position relationship, such that light rays each being emitted by the various light-emitting units and failing to go beyond the predetermined divergence angle range penetrate and emit outwards from the various light-transmitting portions respectively so as to function as the controlled light; and the plurality of solar-cell plates are configured to absorb the light rays each being emitted by the various light-emitting units and going beyond the predetermined divergence angle, so as to be recycled again by the solar-cell plate to generate electric energy, which energy may be provided to the light-emitting units to generate light.

As to the light source control assembly and the method for manufacturing the same as set forth above, similar to the embodiment of FIGS. 1-3, since the solar-cells are contained within the light source control assembly, and then the solar-cells absorb the light at a large angle which is emitted from the light-emitting units and may not be used directly to generate the controlled light, so as to convert the energy of such portion of light into the electric energy for power supply to the light-emitting units. a light utilization rate of the light source control assembly of the embodiment is enhanced and a power consumption of the light-emitting units is decreased, and desired controlled light beams are also obtained.

In summary, according to various exemplary embodiments of the present disclosure, there is provided a light source control assembly, comprising: at least one solar cell plate; a plurality of light-emitting units configured to emit light by receiving electrical energy; and a light controlling structure in a light emitting direction of the plurality of light emitting units. The light controlling structure includes a plurality of light-transmitting portions and a plurality of light-blocking portions, and the plurality of light-transmitting portions are configured such that light rays which are emitted by various light-emitting units and fail to go beyond a predetermined divergence angle range may propagate through the plurality of light-transmitting portions and exit therefrom. And the plurality of light-blocking portions are configured such that the light rays which are emitted by various light-emitting units and go beyond the predetermined divergence angle range may be absorbed again by the solar-cell plate so as to be recycled to generate electric energy.

Therefore, in various embodiments of the disclosure, light at a relatively large angle is which is not required in a controlled light source may then be converted to electric energy of solar-cell(s), which electric energy may for example further be supplied to the OLED light-emitting units, so as to enhance light utilization rate and to obtain desired controlled light beams.

Figure 7:
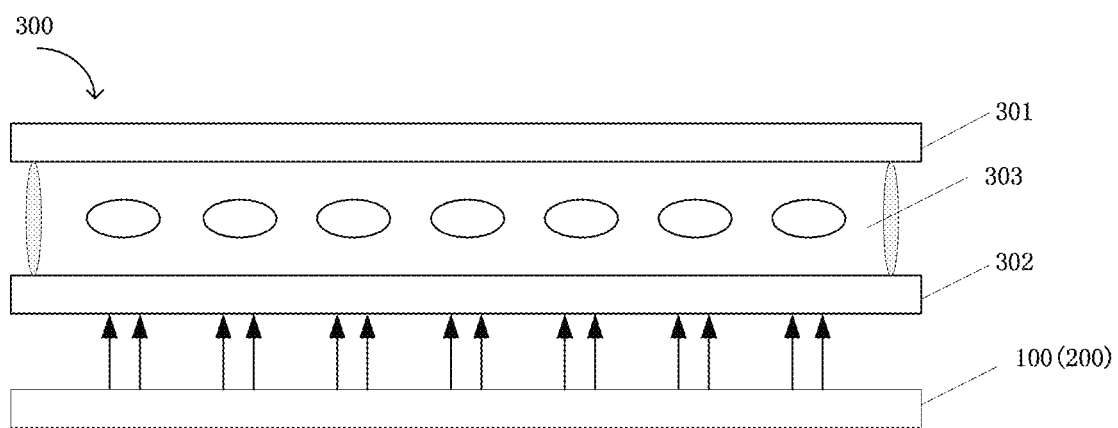
FIG. 7 illustrates a display device according to an embodiment of the disclosure.

In still another embodiment of the disclosure, as illustrated in FIG. 7, there is further provided a display device, comprising: a display panel 300; and a backlight source comprising the light source control assembly 100 or 200 as above, whose specific structure is not set forth here repeatedly any more.

Specifically, as illustrated in FIG. 7, the display panel 300 is for example a LCD panel comprising: a color filter substrate 301, an array substrate 302 and a liquid crystal layer 303 interposed between the color filter substrate and the array substrate. It may be understood by those skilled in the art that, the display panel 300 may for example further comprise a polarizer, an alignment film, a diffusion film and other known structures, without repeating here further.

Since the light source control assembly in above embodiments are used, the backlight source of the display device of this embodiment possesses a relatively low power consumption, a relatively high light utilization rate, and meanwhile controlled light beams may be obtained to be used for the LCD display panel as a display light source therefor, so as to meet requirements in certain application context, such as peer-proof (i.e., privacy) context.

With the light source control assembly, the display device and the method for manufacturing a light source control assembly, other light rays which may not be used directly for generating controlled light beams may be recycled by the photoelectric converter(s), so as to decrease loss in light emitted by the light-emitting units and to increase a utilization rate of light, and further to obtain desired controlled light beams simultaneously.

Even if some specific embodiments of the disclosure are depicted as above by referring to attached figures, it may be understood by those skilled in the art that, in a condition without incurring any contradiction, the components of the light source control assembly of various embodiments may be used in combination with or used to substitute for one another. By way of example, although the embodiments illustrated in FIGS. 1-3 use dot light sources, correspondingly, the cover plate may for example use round-shaped light-transmitting portions and annular-shaped light-blocking portions. However, the embodiments illustrated in FIGS. 1-3 may also use linear light sources, and correspondingly, the covering plate may use strip-shaped light-transmitting portions and strip-shaped light-blocking portions. Similarly, although the embodiments illustrated in FIGS. 4-6 use linear light sources, correspondingly, the cover plate may for example use strip-shaped light-transmitting portions and strip-shaped light-blocking portions. However, the embodiments illustrated in FIGS. 4-6 may also use dot light sources, and correspondingly, the covering plate may use round-shaped light-transmitting portions and annular-shaped light-blocking portions.

In addition, although in above embodiments, the solar-cell plate(s) are used as examples of the photoelectric converter(s), it should be understood by those skilled that, other photoelectric converter(s) may be used instead of the solar-cell plate, as long as light at a large angle which may not be used directly to generate controlled light beams may be recycled so as to enhance light utilization rate.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present disclosure exemplarily, and should not be deemed as a restriction thereof.

Although several exemplary embodiments of the general concept of the present disclosure have been shown and described, it would be appreciated by those skilled in the art that various changes or modifications may be made in these embodiments without departing from the principles and spirit of the disclosure and lie within the scope of present application, which scope is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A light source control assembly, comprising:
a photoelectric converter;
at least one light-emitting unit; and
a light controlling structure arranged opposite to and spaced apart from the at least one light-emitting unit merely in a normal direction along an optical axis of the at least one light-emitting unit, and configured to pass therethrough a first portion of light and to block a second portion of light, which light is emitted by various light-emitting units of the at least one light-emitting unit, and to generate a plurality of controlled light beams separated from one another with the first portion of light passing therethrough,
wherein the second portion of light blocked by the light controlling structure from the various light-emitting units is received by the photoelectric converter,
wherein the light controlling structure comprises:
a plurality of light-transmitting portions, configured such that light rays each being emitted by the various light-emitting units and failing to go beyond a first divergence angle range penetrate and emit outwards from the various light-transmitting units respectively; and
a plurality of light-blocking portions, configured such that the light rays each being emitted by the various light-emitting units and going beyond the first divergence angle range are received by the photoelectric converter to produce electric energy; and
wherein:
the at least one light emitting-unit is provided on the photoelectric converter; the light-controlling structure comprises a covering plate opposite to and spaced apart from the photoelectric converter, the cover plate being above a side of the at least one light-emitting unit facing away from the photoelectric converter and comprising the plurality of light-transmitting portions and the plurality of light-blocking portions; and the plurality of light-blocking portions comprise a plurality of light reflecting portions configured to reflect the light rays each being emitted by the various light-emitting units and going beyond the first divergence angle range, towards the photoelectric converter, or
the light source control assembly further comprises a substrate on which the at least one light-emitting unit is provided; the light-controlling structure comprises a covering plate opposite to and spaced apart from the substrate, the cover plate being above a side of the at least one light-emitting unit facing away from the substrate and comprising the plurality of light-transmitting portions and the plurality of light-blocking portions; and the plurality of light-blocking portions comprise a plurality of photoelectric converters configured to receive light rays each being emitted by the various light-emitting units and going beyond the first divergence angle.

2. The light source control assembly according to claim 1, wherein the covering plate is a transparent covering plate, the plurality of light reflecting portions comprise a plurality of light-reflecting elements on a surface of the transparent covering plate facing towards the photoelectric converter, and the plurality of light transmitting portions comprises at least one of portions of the transparent covering plate other than the plurality of light-reflecting elements and through-holes formed in the transparent covering plate.

3. The light source control assembly according to claim 2, wherein the plurality of light-reflecting elements are a plurality of light-reflecting coatings applied on a surface of the cover plate facing towards the photoelectric converter.

4. The light source control assembly according to claim 1, wherein the covering plate is an opaque covering plate, the plurality of light reflecting portions comprise a plurality of light-reflecting elements on a surface of the opaque covering plate facing towards the photoelectric converter, and the plurality of light transmitting portions comprise through-holes formed in the opaque covering plate.

5. The light source control assembly according to claim 1, wherein the covering plate is a transparent covering plate, the plurality of photoelectric converters are formed on a surface of the transparent covering plate facing towards the substrate, and the plurality of light-transmitting portions comprise at least one of portions of the transparent covering plate other than the plurality of photoelectric converters and through-holes formed in the transparent covering plate.

6. The light source control assembly according to claim 1, wherein the covering plate is an opaque covering plate, and the plurality of photoelectric converters are formed on a surface of the opaque covering plate facing towards the substrate, and the plurality of light-transmitting portions comprise through-holes formed in the opaque covering plate.

7. The light source control assembly according to claim 1, wherein the plurality of photoelectric converters are thin-film batteries.

8. The light source control assembly according to claim 1, wherein each of the at least one light-emitting unit forms a point light source, and each of the plurality of light-transmitting portions of the covering plate forms a round shape, respectively, each of the plurality of light-transmitting portions having a radius $R=Y*tg(\alpha)$, wherein Y refers to a distance between one light-emitting unit and a corresponding one of the plurality of light-transmitting portions, and $\alpha$ refers to the first divergence angle.

9. The light source control assembly according to claim 8, wherein the plurality of light-blocking portions comprise at least annular portions surrounding the plurality of light-transmitting portions of round-shape respectively in one-to-one correspondence and abutting against and being tangent to one another at outer peripheries thereof, with their respective tangent points among the annular portions extending in at least a row in a longitudinal direction of the covering plate, and with a width of each of the annular portions in respective radial direction being at least $Z1=Y*tg(\beta)-R$, wherein $\beta$ refers to a maximal light divergence angle of each of the at least one light-emitting unit.

10. The light source control assembly according to claim 9, wherein the maximal light divergence angle $\beta$ of each of the at least one light-emitting unit is not less than 50° and not more than 70°.

11. The light source control assembly according to claim 1, wherein the at least one light-emitting unit forms linear light sources respectively, and the plurality of light-transmitting portions of the covering plate are formed to be strip shapes extending in a transverse direction perpendicular to a longitudinal direction of the covering plate and in parallel with one another, with a width of each of the plurality of light-transmitting portions being $X=2Y*tg(\alpha)$, wherein Y refers to a distance between the one light-emitting unit and a corresponding one of the plurality of light-transmitting portions, an $\alpha$ refers to the first divergence angle.

12. The light source control assembly according to claim 11, wherein the plurality of light-blocking portions comprise at least strip-shaped portions adjacent to each side of the plurality of light-transmitting portions, with a width of each of the strip-shaped portions being at least $Z2=Y*tg(\beta)-X/2$, wherein $\beta$ refers to a maximal light divergence angle of each of the at least one light-emitting unit.

13. The light source control assembly according to claim 1, wherein the first divergence angle $\alpha$ is not less than 1° and not more than 10°.

14. The light source control assembly according to claim 1, wherein each of the at least one light-emitting unit is an OLED element.

15. The light source control assembly according to claim 1, wherein the photoelectric converter comprises at least one of an opaque solar-cell panel, comprising: an opaque silicon thin-film solar-cell, a copper indium gallium selenide thin-film solar-cell, and a polymer solar-cell.

16. A display device, comprising:
a display panel; and
a backlight source, comprising the light source control assembly according to claim 1.

17. A method for manufacturing a light source control assembly, comprising:
providing a photoelectric converter;
providing at least one light-emitting unit, each configured to emit light by receiving electric energy; and
providing a light controlling structure opposite to and spaced apart from the at least one light-emitting unit merely in a normal direction along an optical axis of the at least one light-emitting unit, the light controlling structure being configured to pass therethrough a portion of and to block another portion of light, which light is emitted by various light-emitting units of the at least one light-emitting unit, and to generate a plurality of controlled light beams separated from one another with the portion of light passing therethrough, with the another portion of light failing to pass therethrough from the various light-emitting units being received by the photoelectric converter,
wherein the light controlling structure comprises:
a plurality of light-transmitting portions, configured such that light rays each being emitted by the various light-emitting units and failing to go beyond a first divergence angle range penetrate and emit outwards from the various light-transmitting units respectively; and
a plurality of light-blocking portions, configured such that the light rays each being emitted by the various light-emitting units and going beyond the first divergence angle range are received by the photoelectric converter to produce electric energy; and
wherein:
the at least one light emitting-unit is provided on the photoelectric converter; the light-controlling structure comprises a covering plate opposite to and spaced apart from the photoelectric converter, the cover plate being above a side of the at least one light-emitting unit facing away from the photoelectric converter and comprising the plurality of light-transmitting portions and the plurality of light-blocking portions; and the plurality of light-blocking portions comprise a plurality of light reflecting portions configured to reflect the light rays each being emitted by the various light-emitting units and going beyond the first divergence angle range, towards the photoelectric converter, or
the light source control assembly further comprises a substrate on which the at least one light-emitting unit is provided; the light-controlling structure comprises a covering plate opposite to and spaced apart from the substrate, the cover plate being above a side of the at least one light-emitting unit facing away from the substrate and comprising the plurality of light-transmitting portions and the plurality of light-blocking portions; and the plurality of light-blocking portions comprise a plurality of photoelectric converters configured to receive light rays each being emitted by the various light-emitting units and going beyond the first divergence angle.

* * * * *